(12) United States Patent
Wilson-Jones et al.

(10) Patent No.: US 12,728,906 B2
(45) Date of Patent: Sep. 8, 2026

(54) STEERING COLUMN ASSEMBLY FOR A VEHICLE

(71) Applicant: ZF Automotive UK Limited, Solihull (GB)

(72) Inventors: Russell Wilson-Jones, Stratford upon Avon (GB); Samuel Morris, Redditch (GB); Timothy Buttery, Halesowen (GB); Philip Owen Browne, Bromsgrove (GB); Pablo Rojo, Stratford upon Avon (GB)

(73) Assignee: ZF AUTOMOTIVE UK LIMITED, Solihull (GB)

( * ) Notice: Subject to any disclaimer, the term of this patent is extended or adjusted under 35 U.S.C. 154(b) by 629 days.

(21) Appl. No.: 18/298,705

(22) Filed: Apr. 11, 2023

(65) Prior Publication Data

US 2023/0331281 A1 Oct. 19, 2023

(30) Foreign Application Priority Data

Apr. 13, 2022 (GB) .................................... 2205509

(51) Int. Cl.
*B62D 1/16* (2006.01)
*B62D 5/00* (2006.01)
*B62D 5/04* (2006.01)

(52) U.S. Cl.
CPC ............... *B62D 1/16* (2013.01); *B62D 5/001* (2013.01); *B62D 5/0403* (2013.01);
(Continued)

(58) Field of Classification Search
CPC ........ B62D 1/16; B62D 5/001; B62D 5/0403; B62D 5/0406; B62D 5/0409; B62D 5/0454
(Continued)

(56) References Cited

U.S. PATENT DOCUMENTS

2014/0288776 A1* 9/2014 Anderson ............... F16F 9/064 701/37
2015/0353128 A1* 12/2015 Shibuya ................ B60W 10/02 701/41
(Continued)

FOREIGN PATENT DOCUMENTS

CN 105313954 A 2/2016
DE 102016208317 A1 11/2017
(Continued)

OTHER PUBLICATIONS

German Search Report for corresponding German Application Serial No. 10 2023 201 564.1, mailed Mar. 5, 2024, pp. 1-12.

*Primary Examiner* — Jacob D Knutson
(74) *Attorney, Agent, or Firm* — Tarolli, Sundheim, Covell & Tummino LLP

(57) ABSTRACT

A steering column assembly for a vehicle, comprises: an elongate steering column mounted for rotation about its longitudinal axis and configured for attachment to a steering wheel at one end; a first gear connected to the steering column at a location spaced from the one end to which the steering wheel is attached and configured to rotate with the steering column; first and second motors, each having an output shaft; first and second worm screws directly connected to and rotatable with the output shaft of the first and second motors respectively and engaged with the first gear; a control arrangement configured to operate the first and second motors; and a motor position sensor arrangement for sensing the rotational position of the motor output shafts, each sensor arrangement comprising a target member fixedly mounted to a respective motor output shaft on the opposite side of the worm screw from the motor and a sensor for detecting the target member.

21 Claims, 2 Drawing Sheets

(52) U.S. Cl.
CPC ......... *B62D 5/0406* (2013.01); *B62D 5/0409* (2013.01); *B62D 5/0454* (2013.01)

(58) Field of Classification Search
USPC .................................................. 180/443, 444
See application file for complete search history.

(56) References Cited

U.S. PATENT DOCUMENTS

| | | | | |
|---|---|---|---|---|
| 2018/0346014 | A1* | 12/2018 | Beyerlein | B62D 5/003 |
| 2019/0367076 | A1* | 12/2019 | Kim | B62D 5/0409 |
| 2020/0377142 | A1* | 12/2020 | Wilson-Jones | B62D 1/10 |
| 2023/0085431 | A1* | 3/2023 | Ahn | F16H 57/039<br>180/444 |

FOREIGN PATENT DOCUMENTS

| | | | | |
|---|---|---|---|---|
| DE | 102017205721 | A1 * | 10/2018 | F16H 57/006 |
| DE | 102019217958 | A1 | 6/2020 | |
| DE | 102021103305 | A1 | 9/2021 | |
| DE | 112019003315 | T5 | 9/2021 | |
| EP | 3929062 | A1 * | 12/2021 | G01D 5/245 |
| GB | 2579374 | A | 6/2020 | |
| JP | 2010023656 | A | 2/2010 | |

* cited by examiner

STEERING COLUMN ASSEMBLY FOR A VEHICLE

CROSS-REFERENCE TO RELATED APPLICATION

This application claims priority to UK Patent Application No. 2205509.9, filed Apr. 13, 2022, the disclosure of which is incorporated herein by reference in its entirety.

TECHNICAL FIELD

The present disclosure relates to steering column assemblies for vehicles and more specifically to such assemblies for use with a steer-by-wire hand wheel actuator.

BACKGROUND

In steer-by-wire arrangements, a handwheel (steering wheel) is connected to one end of a rotatably mounted shaft whose angular displacement is measured to generate a signal which is used to control the orientation of the steered wheels of the vehicle. The arrangement is commonly also provided with an electric motor connected to the shaft to provide a controlled amount of torque in the opposite direction to the torque applied by the driver, in order to provide a sensation of road feel to the driver.

In such arrangements, typically an electric motor under the control of an ECU (electronic control unit) drives a worm screw engaged with a worm gear which rotates with the shaft to which the steering wheel is connected. It is desirable to take steps to bias the worm screw into engagement with the worm gear in order to reduce gear rattle which can occur when the torque and direction of the motor are reversed.

Steer-by-wire steering systems can be used in vehicles in which the vehicle steering is always under the control of a driver and also in autonomous vehicles. Autonomous vehicles are intended to be used primarily in an autonomous mode, in which control of the vehicle is carried out without manual intervention. However, it is desirable for autonomous vehicles to be controllable manually if necessary or desired, and for that reason, vehicle controls such as a steering wheel must be provided. Such steering wheels desirably have a "steer-by-wire" operation to remove the requirement for connecting and disconnecting mechanical steering mechanisms.

GB 2579374A discloses a steering column assembly for a vehicle, having a rotatably mounted elongate steering column to one end of which a steering wheel is connected. A gear is connected to, and rotates with, the steering column and is engaged by two worm screws, the rotation of each of which is controlled by a respective motor. The motors can be operated in a first mode in which they apply torque to the steering column in opposite directions and in a second mode in which they apply torque to the steering column in the same direction.

In the prior art arrangements, a motor position sensor (MPS) is used to determine the rotational position of the motor shafts. The MPS generally comprises a so-called target (typically a magnet) mounted on, and rotatable with, a motor shaft, and a detector for sensing the position of the target and therefore the position of the motor.

SUMMARY

In accordance with a first aspect of the present disclosure a steering column assembly for a vehicle comprises:

an elongate steering column mounted for rotation about its longitudinal axis and configured for attachment to a steering wheel at one end;

a first gear connected to the steering column at a location spaced from the steering wheel attachment location and configured to rotate with the steering column;

first and second motors, each having an output shaft;

first and second worm screws directly connected to and rotatable with the output shaft of the first and second motors respectively and engaged with the first gear;

a control arrangement configured to operate the first and second motors; and a motor position sensor arrangement for sensing the rotational position of the motor output shafts, each sensor arrangement comprising a target member fixedly mounted to a respective motor output shaft on the opposite side of the worm screw from the motor and a sensor for detecting the target member.

Locating the motor position sensor arrangement remotely from theft respective motors, i.e. on the opposite side of the worm screw from the associated motor, improves the packaging of the steering assembly, i.e. makes more effective and/or efficient use of the available space. It also reduces the incidence and/or effect of electromagnetic disturbances from the windings of the motors.

The first gear may be connected to the steering column at the opposite end of the steering column from the steering wheel.

Each target member may be mounted to one end of a respective motor output shaft.

Each motor may be mounted at one end of a respective motor output shaft.

The steering column assembly may further comprise a bearing for the output shaft of each motor, located between the respective worm screw and the target member.

In one exemplary arrangement, each target member comprises a magnetic member.

Each target member may comprise a variable reluctance resolver.

In one exemplary arrangement, the sensors for detecting the target members are located at or adjacent to the ends of the motor output shafts on the opposite side of the worm screws from the motors.

The sensors for detecting the target members may be mounted on a circuit board.

The rotational axes of the output shafts of the first and second motors may be substantially parallel.

The worm screws may be positioned on opposite sides of the rotational axis of the first gear, for example at diametrically opposite sides of the rotational axis of the first gear.

The first and second worm screws may form part of the output shaft of the first and second motors respectively.

The rotational axes of the output shafts of the first and second motors may be oriented substantially perpendicularly to the rotational axis of the steering column.

The first and second motors may be positioned below the first and second worm screws respectively.

The present disclosure also includes a vehicle comprising a steering column assembly in accordance with the disclosure.

BRIEF DESCRIPTION OF THE DRAWINGS

By way of example only, a specific exemplary arrangement of the present disclosure will now be described with reference to the accompanying drawings, in which.

DETAILED DESCRIPTION

Figure 1:
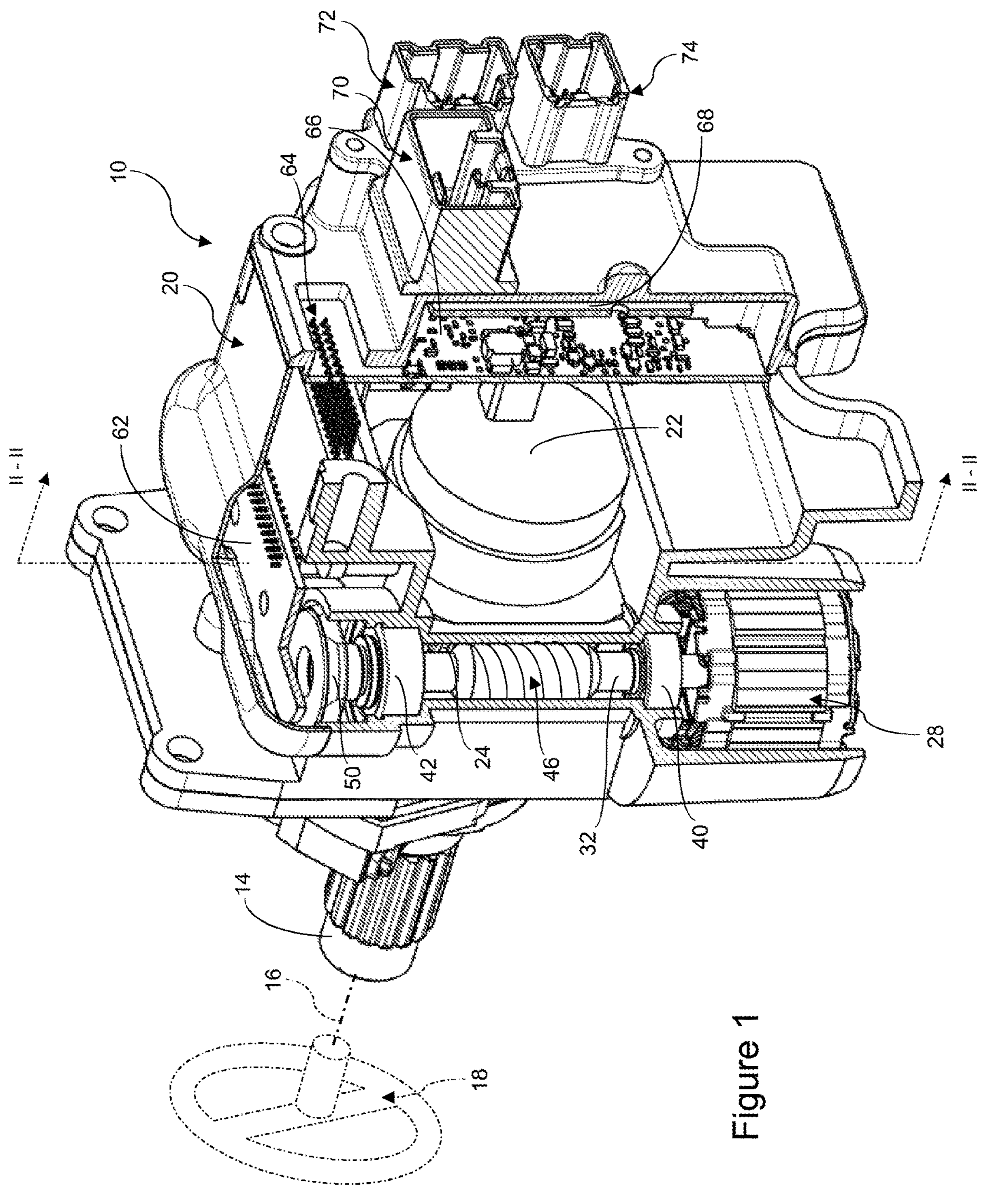
FIG. 1 is a perspective view, partly cut away, of an exemplary arrangement of a steering column assembly in accordance with the present disclosure.

A steer-by-wire steering column assembly 10 comprises a straight elongate steer-by-wire steering column 14 (only the lower end of which is illustrated) which is rotatably mounted about its longitudinal axis 16. A steering wheel 18 illustrated schematically in FIG. 1 is secured to the upper end of the steering column 14, by which the steering column 14 can be rotated by a driver. In the drawings, the steering column 14 is shown as a single shaft, but in practice it may be formed from a number of components. For example, the steering column may be formed from several telescopic parts and may have a torque sensor (e.g. a torsion bar assembly) between the steering wheel and the opposite end.

Figure 2:
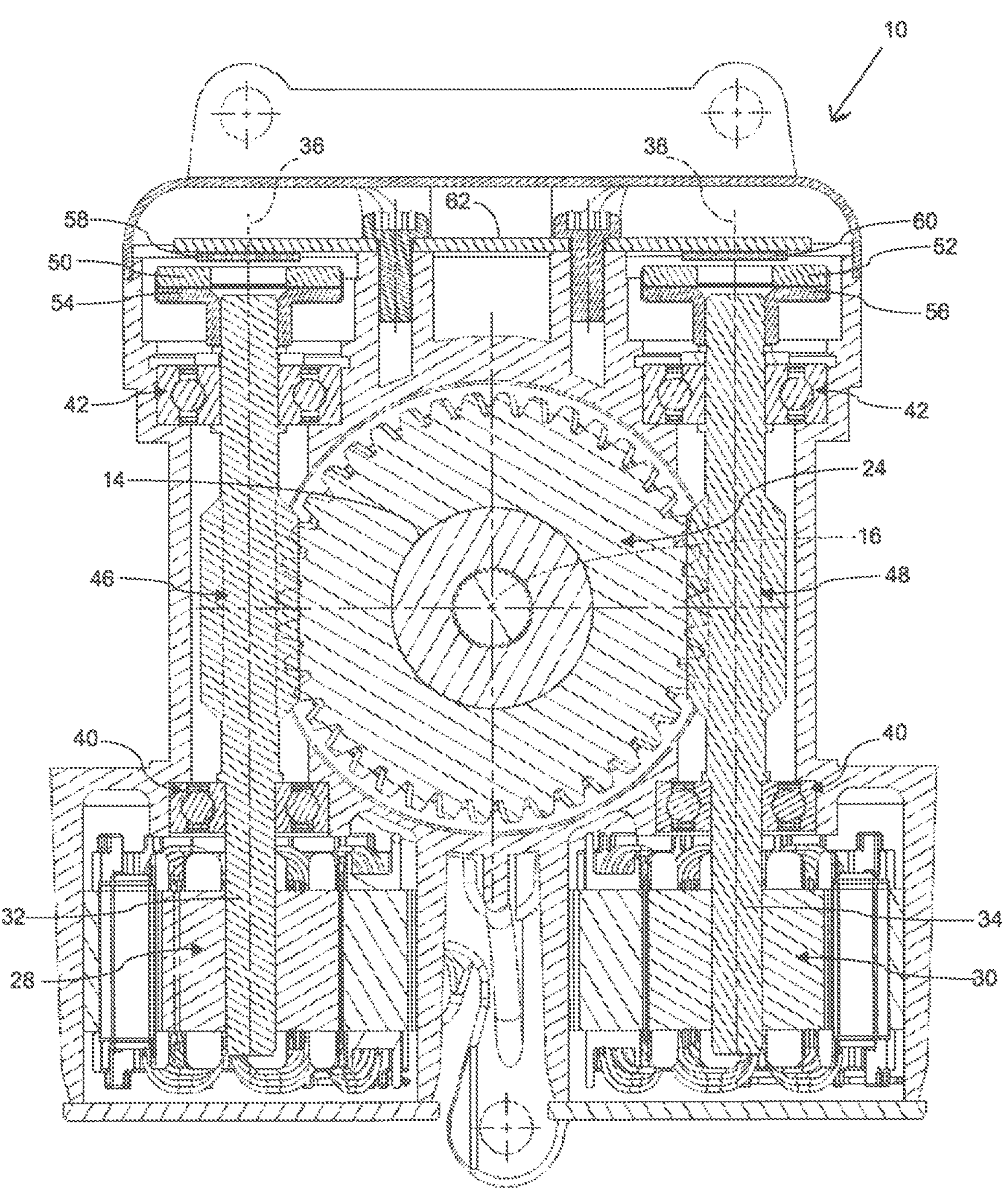
FIG. 2 is a vertical cross-section through the steering column assembly of FIG. 1, looking in the direction of arrows II-II of FIG. 1.

The opposite, lower end of the steering column 14 is received in a housing 20, in which it is rotatably mounted by a bearing illustrated generally at 22. As best seen in FIG. 2, a spur gear (pinion gear) 24 is fixedly mounted on the lower end of the steering column 14 longitudinally inwardly of the bearing 22, and is thereby constrained to rotate with the steering column 14 and steering wheel 18.

The housing 20 also encloses two identical electric motors 28, 30, each having a respective identical motor output shaft 32, 34 driven directly by the respective motor 28, 30. The output shafts 32, 34 extend with their longitudinal axes 36, 38 parallel to each other and are rotatably mounted with respect to the housing 20 by lower and upper bearings 40, 42. In use, the steering column assembly 10 is installed such that the longitudinal/rotational axes 36, 38 of the output shafts 32, 34 are oriented perpendicularly with respect to the rotational axis 16 of the steering column 14.

Each motor output shaft 32, 34 is formed into a worm screw 46, 48 at a location approximately midway between the opposite ends of the respective shaft. The worm screws 46, 48 are identical, and are meshed with the spur gear (pinion gear) 24 at diametrically opposed positions on opposite sides of the gear.

An annular motor position sensor (MPS) target magnet 50, 52 is fixedly secured to the end of each motor output shaft 32, 34 remote from the motor 28, 30, i.e. on the opposite side of the worm screw from the motor, by mounting cups 54, 56 fixedly mounted on the end of each motor output shaft 32, 34. The MPS target magnets 50, 52 thereby rotate with their respective motor output shafts 32, 34 and their rotation (and thereby the rotation of the shafts 32, 34) is detected by a respective MPS sensor 58, 60 mounted on the undersurface of an MPS sensor circuit board 62 mounted within the housing. The MPS target magnets 50, 52 and the MPS sensors 58, 60 are known, and different types of magnets and sensors may be used depending on the circumstances.

The MPS sensors 58, 60 are connected to monitoring and control circuitry on the MPS sensor circuit board 62 which is configured to measure the rotation of the motor output shafts 32, 34. Signals from the MPS sensors 58, 60 are fed via a first connector 64 to a first PCB 66 of an electronic control unit (ECU). The ECU includes a first and second printed circuit board (PCBs) 66, 68 and controls the operation of the two motors 28, 30 in order to apply a desired torque from each motor 32, 34 to the steering column 14 and thereby to the steering wheel 18 in a known manner, as will be described.

The rear of the housing 20 is also provided with electrical connectors 70, 72, 74 which are configured to mate with complementary connectors on a vehicle to which the steering assembly is to be fitted.

In use, the steering assembly 10 is installed in a vehicle, and typically the steering column 14 is inclined to the horizontal by around 20° to 25°. Rotation of the steering wheel 18 by a driver results in rotation of the steering column 14 which is measured in a known manner and used to control the orientation of the steered wheels of the vehicle by an electronic control unit in a steer-by-wire manner, i.e. without any direct mechanical connection between the steering wheel and the steered wheels. Rotation of the worm screws 46, 48 by their respective motors 28, 30 is controlled by the ECU formed by the PCBs 66, 68 to apply feedback torque to the steering column 14 and the steering wheel 18, in order to provide a sensation of road feel to the driver. By using two worm screws 46, 48, the torque applied to each of them can be controlled in order to reduce backlash and gear rattle.

Rotation of the motor output shafts 32, 34, and thereby of the worm screws 46, 48, results in rotation of the annular MPS magnets 50, 52 mounted on the motor output shafts 32, 34 on the opposite side of the worm screws 46, 48 from the respective motors 28, 30. Rotation of the MPS magnets 50, 52 is detected by the respective motion position sensors 58, 60 on the MPS sensor board 62 and is used by the ECU formed by the PCBs 66, 68 to control the motors 28, 30 in order to apply an appropriate amount of torque to the worm screws 46, 48.

Locating the MPS magnets 50, 52 (and, by extension, the MPS sensors 58, 60) remotely from their respective motors 28, 30, i.e. at the opposite end of the respective motor output shaft 32, 34, improves the packaging of the steering assembly 10, i.e. makes more effective and/or efficient use of the available space, and reduces the incidence and/or effect of electromagnetic disturbances from the windings of the motors 28, 30.

The disclosure is not restricted to the details of the foregoing exemplary arrangement.

For example, the magnetic target members 50, 52 and their associated sensors 58, 60 may be replaced with other arrangements of detecting the angular positions of the output shafts of the first and second motors. For example, the detecting arrangement may comprise optoelectronic sensing arrangement, a variable reluctance resolver (in which case the target member would be the resolver rotor) or some other arrangement for detecting the angular positions of the motor output shafts.

The invention claimed is:

1. A steering column assembly for a vehicle, comprising:

an elongate steering column mounted for rotation about a longitudinal axis of the steering column and configured for attachment to a steering wheel at one end;

a first gear connected to the steering column at a location spaced from a portion of the steering column where the steering wheel is attached, the first gear configured to rotate with the steering column;

first and second motors, each having an output shaft;

first and second worm screws directly connected to and rotatable with the output shaft of the first and second motors respectively and engaged with the first gear; control configured to operate the first and second motors to apply a feedback torque to the steering column; and a respective motor position sensor arrangement for sensing a rotational position of the motor output shafts, each motor position sensor arrangement comprising a target member fixedly mounted to the respective motor output shaft on an opposite side of the worm screw from the motor and a sensor for detecting the target member.

2. A steering column assembly as claimed in claim 1, wherein the first gear is connected to the steering column at an opposite end of the steering column from the steering wheel.

3. A steering column assembly as claimed in claim 2, wherein each target member is mounted to one end of the respective motor output shaft.

4. A steering column assembly as claimed in claim 1, wherein each target member is mounted to one end of the respective motor output shaft.

5. A steering column assembly as claimed in claim 1, wherein each motor is mounted at one end of the respective motor output shaft.

6. A steering column assembly as claimed in claim 1, further comprising a bearing for the output shaft of each motor, located between the respective worm screw and the target member.

7. A steering column assembly as claimed in claim 6, wherein each target member comprises a variable reluctance resolver.

8. A steering column assembly as claimed in claim 6, wherein the sensors for detecting the target members are located at or adjacent to the respective ends of the motor output shafts on the opposite side of the worm screws from the motors.

9. A steering column assembly as claimed in claim 6, wherein the sensors for detecting the target members are mounted on a circuit board.

10. A steering column assembly as claimed in claim 1, wherein each target member comprises a magnetic member.

11. A steering column assembly as claimed in claim 1, wherein each target member comprises a variable reluctance resolver.

12. A steering column assembly as claimed in claim 1, wherein the sensors for detecting the target members are located at or adjacent to the respective ends of the motor output shafts on the opposite side of the worm screws from the motors.

13. A steering column assembly as claimed in claim 1, wherein the sensors for detecting the target members are mounted on a circuit board.

14. A steering column assembly as claimed in claim 1, wherein rotational axes of the output shafts of the first and second motors are substantially parallel.

15. A steering column assembly as claimed in claim 1, wherein the worm screws are positioned on opposite sides of a rotational axis of the first gear.

16. A steering column assembly as claimed in claim 15, wherein the worm screws are positioned at diametrically opposite sides of the rotational axis of the first gear.

17. A steering column assembly as claimed in claim 1, wherein the first and second worm screws form part of the output shaft of the first and second motors respectively.

18. A steering column assembly as claimed in claim 1, wherein rotational axes of the output shafts of the first and second motors are oriented substantially perpendicularly to a rotational axis of the steering column.

19. A steering column assembly as claimed in claim 1, wherein the first and second motors are positioned below the first and second worm screws respectively.

20. A vehicle comprising a steering column assembly as claimed in claim 1.

21. A steering column assembly as claimed in claim 1, wherein the steering column is free of a mechanical connection to steered wheels of the vehicle.

* * * * *